(12) United States Patent
Zhang et al.

(10) Patent No.: US 11,943,024 B2
(45) Date of Patent: Mar. 26, 2024

(54) BEAMFORMING SCHEME SWITCHING

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Rohit U. Nabar, Sunnyvale, CA (US); Wei Zeng, Saratoga, CA (US); Weidong Yang, San Diego, CA (US); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 17/598,226

(22) PCT Filed: Jun. 14, 2021

(86) PCT No.: PCT/US2021/037280
§ 371 (c)(1),
(2) Date: Sep. 24, 2021

(87) PCT Pub. No.: WO2022/031368
PCT Pub. Date: Feb. 10, 2022

(65) Prior Publication Data
US 2022/0302973 A1    Sep. 22, 2022

(30) Foreign Application Priority Data

Aug. 5, 2020    (WO) ................ PCT/CN2020/107186

(51) Int. Cl.
*H04W 8/24*    (2009.01)
*H04B 7/06*    (2006.01)

(52) U.S. Cl.
CPC ............ *H04B 7/0617* (2013.01); *H04W 8/24* (2013.01)

(58) Field of Classification Search
CPC .............................. H04B 7/0617; H04W 4/20; H04W 8/22–245; H04W 16/28; H04W 36/085; H04W 36/008355; H04W 72/046
See application file for complete search history.

(56) References Cited

U.S. PATENT DOCUMENTS

2020/0212972 A1    7/2020  Zhang et al.
2020/0213054 A1*   7/2020  Park ..................... H04B 7/0639

OTHER PUBLICATIONS

"5G System Overview", retrieved from https://www.3gpp.org/technologies/5g-system-overview and published on Aug. 8, 2022. (Year: 2022).*
ETSI TS 138 306 V15.7.0 (Oct. 2019) "5G; NR; User Equipment (UE) radio access capabilities (3GPP TS 38.306 version 15.7.0 Release 15)" (Year: 2019).*
Remaining Details on Non-CB Based UL Transmission, R1-1800627, 3GPP TSG RAN WG1 Meeting AH 1801, Jan. 22-26, 2018, 3 pages.
International Patent Application No. PCT/US2021/037280, International Search Report and Written Opinion, dated Nov. 29, 2021, 19 pages.

(Continued)

*Primary Examiner* — Ronald Eisner
(74) *Attorney, Agent, or Firm* — Kilpatrick Townsend & Stockton LLP

(57) ABSTRACT

The present application relates to devices and components including apparatus, systems, and methods to provide beamforming scheme selection and signaling in wireless communication systems.

7 Claims, 9 Drawing Sheets

(56) References Cited

OTHER PUBLICATIONS

International Patent Application No. PCT/US2021/037280, Invitation to Pay Additional Fees and Where Applicable, Protest Fee, dated Oct. 7, 2021, 4 pages.
3rd Generation Partnership Project; Technical Specification Group Radio Access Network; NR; Multiplexing and channel coding (Release 16), 3GPP TS 38.212 V16.2.0, Jun. 2020, 151 pages.
3rd Generation Partnership Project; Technical Specification Group Radio Access Network; NR; Physical layer procedures for data (Release 16), 3GPP TS 38.214 V16.2.0, Jun. 2020, 163 pages.
3rd Generation Partnership Project; Technical Specification Group Radio Access Network; NR; Medium Access Control (MAC) protocol specification (Release 16), 3GPP TS 38.321 V16.1.0, Jul. 2020, 151 pages.
3rd Generation Partnership Project; Technical Specification Group Radio Access Network; NR; Radio Resource Control (RRC) protocol specification (Release 16), 3GPP TS 38.331 V16.1.0, Jul. 2020, 906 pages.
International Patent Application No. PCT/US2021/037280, International Preliminary Report on Patentability, dated Feb. 16, 2023, 13 pages.

\* cited by examiner

BEAMFORMING SCHEME SWITCHING

CROSS REFERENCES TO RELATED APPLICATIONS

This application is a 371 U.S. National Phase of PCT International Patent Application No. PCT/US2021/037280, filed Jun. 14, 2021, which claims the benefit of PCT International Patent Application No. PCT/CN2020/107186, filed Aug. 5, 2020, which are hereby incorporated by reference in their entireties for all purposes.

BACKGROUND

A user equipment (UE) may use analog beamforming to receive communications from other network components. Analog beamforming may improve coverage.

DETAILED DESCRIPTION

Figure 1:
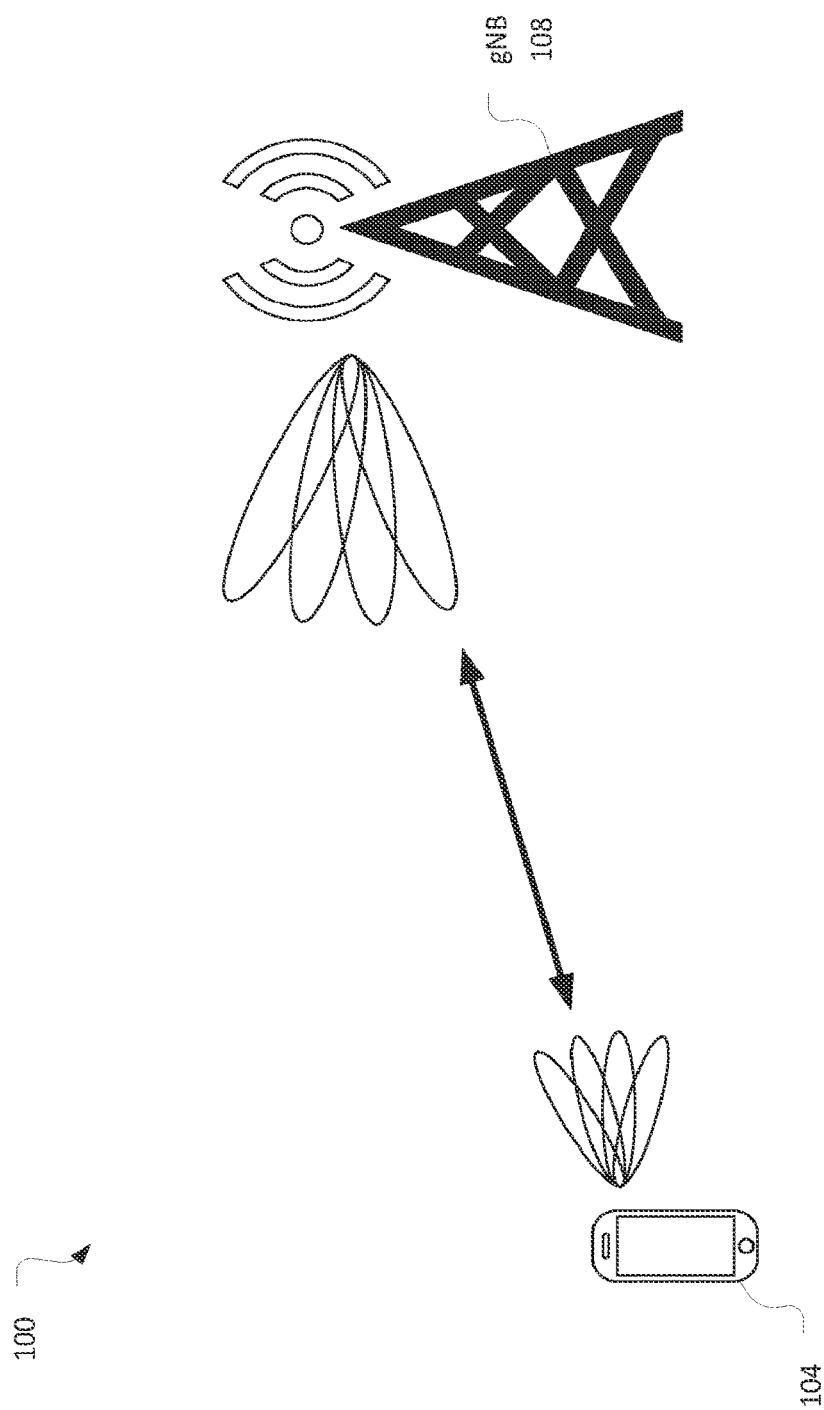
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects, or services accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

Embodiments of the present disclosure describe a UE implementing one or more beamforming schemes including, for example, a channel-based beamforming scheme and a codebook-based beamforming scheme. Various embodiments describe control signaling and beam management operations corresponding to the UE implementing the one or more beamforming schemes.

FIG. 1 illustrates a network environment 100 in accordance with some embodiments. The network environment 100 may include a UE 104 and a gNB 108. The gNB 108 may be a base station that provides a wireless access cell, for example, a 3GPP New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers, and the physical channels may transfer information across the air interface. The physical channels may include a physical broadcast channel (PBCH); a physical downlink control channel (PDCCH); and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine-tuning of time and frequency synchronization.

Transmissions that use different antenna ports may experience different radio channels. However, in some situations different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another, 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI to inform the UE 104 of these QCL relationships.

The UE 104 and the gNB 108 may perform beam management operations to identify and maintain desired beams for transmission in the uplink and downlink directions. The beam management may be applied to both PDSCH and PDCCH in the downlink direction and PUSCH and PUCCH in the uplink direction.

The UE 104 may select a beam to receive downlink transmissions based on beam management-reference signals (BM-RSs), which may include SSBs and CSI-RS for BMs.

The UE 104, while in a radio resource control (RRC)-idle mode, may perform an initial acquisition during a random-access procedure using SSBs and physical random access channel (PRACH) preambles to establish uplink and downlink beam pairs. These initial beam pairs may correspond to relatively wide beams. The UE 104 may then enter an RRC-connected mode and initiate beam refinement procedures to select beams that are more directional and have higher gain. The beam refinement procedures may be based on CSI-RS.

In various embodiments, the gNB 108 may configure the UE 104 with one or more CSI-RS resource sets. Each resource set may include one or more CSI-RS resources. A single resource set may be configured with a sequence of up to 64 CSI-RS resource identities. The resource set configuration may include a flag to indicate whether repetition is enabled. If the gNB 108 sets the repetition flag to "ON," then all the CSI-RSs belonging to the resource set may be transmitted using the same beam; for example, they may be transmitted using the same spatial domain filter. In some embodiments, the gNB 108 may use the repetition flag during beam management procedures to change a beam selection for the purposes of beam refinement, which may be referred to as a P-2 BM procedure, or to improve a downlink UE receive beam, which may be referred to as a P-3 BM procedure.

For the P-3 BM procedure, the gNB 108 may transmit repetitions of the CSI-RS using a beam selected during the P-2 BM procedure. This may provide the UE 104 with sufficient time to switch between its own beam positions and identify the best beam to pair with the beam selected by the gNB 108.

In various embodiments, both digital and analog beamforming concepts may be performed by the UE 104 and the gNB 108. However, digital beamforming may utilize more radio-frequency chains, which may lead to increased power consumption. Therefore, in some embodiments, the UE 104 may rely primarily on analog beamforming, which may improve coverage and provide a desirable link budget, especially when a good gNB/UE beam pair is used.

An analog beamforming weight (W) could be considered as an $N_{ant} \times N_p$ matrix for the UE 104, where $N_{ant}$ indicates a number of antenna elements and $N_p$ indicates a number of radio-frequency (RF) chains. In various embodiments, the UE 104 may determine the beamforming weight W using a codebook-based beamforming scheme or a channel-based beamforming scheme.

In the codebook scheme, W may be selected from a codebook stored at the UE 104 that includes a list of matrices that could be used as beamforming weights. The UE may pre-store the codebook without any measurement. The codebook may include different kinds of beams from different horizontal and vertical directions. One typical example is a discrete Fourier transform (DFT)-based codebook, where each beam weight for each antenna element (m,n) could be generated as $$w_{m,n}(\theta, \varphi) = \frac{1}{\sqrt{MN}} \exp\left\{-j\frac{2\pi}{\lambda}[(m-1)d_v\cos\theta + (n-1)d_H\sin\varphi]\right\},$$

where $\theta$ is the vertical transmission direction, $\varphi$ is the horizontal direction, M is the number of antenna elements in vertical domain, N is the number of antenna elements in horizontal domain, $\lambda$ is waveform length, and $d_v$ is the vertical antenna spacing, $d_H$ is the horizontal antenna spacing.

The UE 104 may need to measure a number symbols of beam management reference signal (BM-RS). The UE 104 does not need to know the effective channel, it only needs to measure the RSRP from each BM-RS. For each measurement, UE selects one beam from the codebook. In one example, for a four-antenna UE with one RF chain, the codebook size and number of symbols of BM-RS that need to be measured may be 16.

In the channel-based scheme, the UE 104 does not need to pre-store any codebook. Instead, the UE 104 may calculate an effective channel matrix after multiple measurement instances to derive a beamforming weight W using, for example, singular value decomposition (SVD). The channel matrix may be obtained by a measurement of $$M = \text{ceil}\left(\frac{N_{ant}}{N_p}\right)$$

symbols of BM-RS within a time window. The time window may be a maximum time window in which a relationship (for example, coherency) between resources used for channel-based beamforming calculations may apply. This time window may be reported by a UE capability report. In one example, for a four-antenna UE with one RF chain, a BM-RS resource may include M-4 symbols within a time window to allow the UE 104 to reconstruct the channel. Thus, a different number of symbols may be needed for different schemes.

Figure 2:
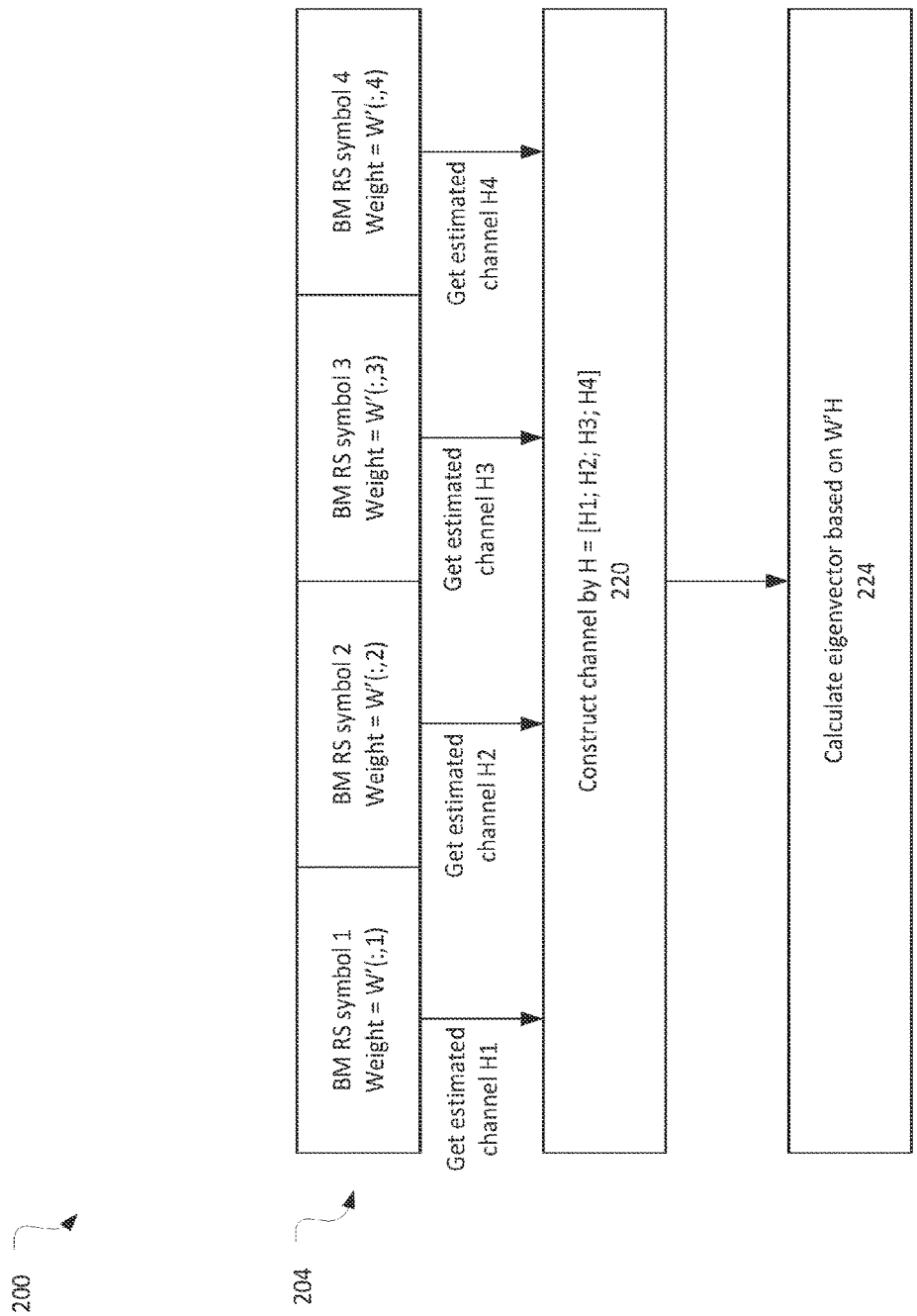
FIG. 2 illustrates a channel-based beamforming operation in accordance with some embodiments.

FIG. 2 illustrates a channel-based beamforming operation 200 in accordance with some embodiments. This embodiment, the UE 104 may have four antenna elements with one port.

At 204, the operation 200 may include applying different sequences from a predefined matrix (which may be stored in memory of the UE) as the weight to receive different symbols of a BM-RS and get estimated channels. The predefined matrix may be, for example, a normalized Hadamard matrix as follows:

$$W' = \begin{bmatrix} 0.5 & 0.5 & 0.5 & 0.5 \\ 0.5 & -0.5 & 0.5 & -0.5 \\ 0.5 & 0.5 & -0.5 & 0.5 \\ 0.5 & -0.5 & -0.5 & -0.5 \end{bmatrix}.$$

A first weight, W'(:,1) may be provided to a BM RS received on a first symbol (BM RS symbol 1); a second weight W'(:,2) may be provided to a BM RS received on a second symbol (BM RS symbol 2); a third weight W'(:,3) may be provided to a BM RS received on a third symbol (BM RS symbol 3); and a fourth weight W'(:,4) may be provided to a BM RS received on a fourth symbol (BM RS symbol 4). In this manner, M instances of the channels (H1-H4) may be obtained.

At 208, the operation may include constructing the combined channel from the M instances of the channel obtained at 204. The combined channel may be given by H=[H1; H2; H3; H4].

At 212, the operation may include calculating an eigenvector based on the combined channel and predefined matrix. In some embodiments, the eigenvector may be obtained by multiplying the predefined matrix W' by the combined channel H. The UE 104 may use the eigenvector for the beamforming weight W to provide the analog beam for receiving downlink communications from the gNB 108.

Thus, in contrast to the codebook-based approach, the channel-based beamforming scheme relies on a contemporaneous construction of a channel by measuring BM-RS within a time window.

The advantages and challenges for each of these beamforming schemes may be different.

For example, advantages of the codebook-based scheme may include that beamforming gain may be included in each measurement; there is no additional timing requirement for BM-RS; and the UE 104 may receive another signal multiplexed in the same symbol in a frequency division multiplexing (FDM) manner. Challenges for the codebook-based scheme may include more number of symbols may be required and the selected beam may not be the best (as the beamforming weight is selected from a predefined number of matrices in the codebook).

Advantages of the channel-based scheme may include that a less number of symbols carrying the BM-RS are required and the selected beam may be closer to an optimized beam as compared to a beam selected from the codebook-based scheme, which could improve system performance. Challenges of the channel-based scheme may include that beamforming gain is not included in each measurement, and the UE may not be able to receive another signal multiplexed in the same symbol in FDM manner.

The desired beamforming scheme for different scenarios may be different. For example, in a low-SINR case, codebook-based beamforming may be more desirable because the beamforming gain added to each measurement may provide more accurate measurements. In a high-SINR case, channel-based beamforming may be more desirable as the measurements may not require the beamforming gain and the optimized beam may increase the system performance.

Providing the use of different beamforming schemes may improve network efficiencies; however, it may also be important to coordinate operation between the UE 104 and the gNB 108 to ensure the gNB 108 is aware of the beamforming scheme used by the UE 104 for beam management. This may allow the gNB to provide downlink signaling that properly supports the selected beamforming scheme. For example, the gNB 108 may need to configure BM-RS for UE beam tracking differently based on the different beamforming schemes. If the UE 104 uses channel-based beamforming scheme, the gNB 108 may only need to configure four OFDM symbols with BM-RS (assuming four antenna elements and one RF chain). If, however, the UE 104 uses codebook-based beamforming scheme, the gNB 108 may need to configure 16 OFDM symbols with the BM-RS. As another example, if the channel-based beamforming is used, the gNB 108 may configure the BM-RS mapping pattern with a burst-like pattern. For example, a BM-RS resource may be configured with the desired number of OFDM symbols so that the BM-RS is transmitted within the time window. The BM-RS may be mapped to resource elements (REs) of the desired number of OFDM symbols based on the same or different RE mappings.

In some embodiments, the gNB 108 may configure TCI information differently based on the type of beamforming scheme used by the UE 104. For example, in some embodiments, the gNB 108 may configure TCIs to provide a plurality of reference signals with a QCL or port association that allows the UE 104 to use measurements from the plurality of reference signals for the channel determination of the channel-based beamforming scheme. Thus, in these embodiments, the gNB 108 may determine aspects of a TCI state, for example, effective time. QCL type, etc., based on whether the UE 104 is using the channel-based beamforming scheme.

In some embodiments, the gNB 108 may determine whether a measurement restriction is valid or not based on the beamforming scheme used by the UE 104. Consider, for example, a time restriction for channel measurements. A UE configured with this parameter, through a CSI report configuration information element, may derive channel measurements for computing CSI reported in a slot may be based on only a most recent occasion of a non-zero power CSI-RS. This may be referred to as one-shot reporting. In some embodiments, the gNB 108 may not configure the UE 104 with one-shot reporting if the UE 104 uses a channel-based beamforming scheme since the UE 104 may need to measure a resource multiple times to get the beamforming weight.

In some embodiments, the gNB 108 may schedule a downlink channel differently based on which beamforming scheme is used by the UE 104. For different schemes, whether the UE 104 can receive signals multiplexed with the BM-RS in FDM manner could be different. For example, for codebook-based scheme, the UE 104 may still be able to receive both signals. However, for channel-based scheme, the UE 104 may not be able to receive both signals. Therefore, if the UE 104 uses a codebook-based scheme, the gNB 108 may multiplex some signals in a same symbol with a BM-RS. However, if the UE 104 uses a channel-based scheme, the gNB 108 may not multiplex other signals in the same symbol with the BM-RS.

Various embodiments describe processes that may be employed to maintain the same understanding between the gNB 108 and the UE 104 on the beamforming schemes. Aspects include reports from the UE 104 on beamforming scheme, and control signaling to/from the gNB 108 for beamforming scheme selection.

In general, the UE 104 may only support one beamforming scheme, or may support both beamforming schemes. If the UE supports both beamforming schemes, the scheme may be switched in a dynamic or semi-static manner. Switching or otherwise selecting a beamforming scheme to be implemented at the UE 104 may be done at the initiative of the UE 104 or the gNB 108.

If the UE 104 only supports one beamforming scheme, there may be two alternatives in order to provide a common understanding of beamforming capabilities between the UE 104 and the gNB 108. The first alternative embodiment may include the UE 104 reporting the beamforming scheme, for example, codebook-based or channel-based, by a UE capability report. In some embodiments, the gNB 108 may send a capability inquiry to the UE 104 to request the UE 104 to send capability information. The UE 104 may respond by sending a UE capability report to provide information requested by the gNB 108.

In some embodiments, the UE capability report may include a beamforming scheme identifier (ID) to identify either the codebook-based beamforming scheme or the channel-based beamforming scheme. The gNB 108 may determine the supported beamforming scheme based on the beamforming scheme ID included in the UE capability report.

In some embodiments, a default beamforming scheme (for example, codebook-based beamforming scheme) may be applied. Both the gNB 108 and the UE 104 may have knowledge of which beamforming scheme is to be considered the default beamforming scheme. Therefore, if the UE 104 supports the default beamforming scheme, there is no need to provide the report. If, on the other hand, the UE 104 supports the non-default beamforming scheme, the UE 104 may generate and send the UE capability report as described above.

The second alternative embodiment may include the gNB 108 determining the beamforming scheme supported based on other, contextual information in a UE capability report. For example, the gNB 108 may determine the supported beamforming scheme based on whether the UE 104 supports measurement restriction for RSRP/SINR measurement. If the UE 104 supports the measurement restriction, the gNB 108 may determine that codebook-based beamforming scheme is used. Otherwise, the gNB 108 may determine that channel-based beamforming scheme is used.

In another example of using contextual information in the UE capability report to determine the supported beamforming scheme, the gNB 108 may determine whether the UE 104 reports the maximum time window for a BM-RS burst. If the UE 104 reports this feature, the gNB 108 may determine that channel-based beamforming scheme is used. Otherwise, the gNB 108 may determine that codebook-based beamforming scheme is used.

For UEs that support both beamforming schemes, the following options may be provided for beamforming scheme selection and reporting.

In some embodiments, different beamforming schemes may be used for different types of BM-RS. This may be due to different coverage for the different types of BM-RSS. For example, the gNB 108 may use a wide beam to transmit SSB and narrow beams to transmit CSI-RSS. Therefore, in this example, it may be more applicable to use a codebook-based scheme for SSB and a channel-based beamforming scheme for CSI-RSS. The UE 104 may report the beamforming scheme for each type of BM-RS by RRC signaling, for example, the UE capability report. In some embodiments, the BM-RSs include: SSB for L1-RSRP/L1-SINR report; CSI-RS in a resource set without repetition (for example, repetition=off); CSI-RS in a resource set with repetition (for example, repetition=on); SSB/CSI-RS for beam failure detection; and SSB/CSI-RS for radio link monitoring.

In some embodiments, the UE 104 may report an update or selection of a beamforming scheme by a MAC CE. This information may be periodically updated and, therefore, may be considered as a semi-static configuration of the beamforming scheme.

Figure 3:
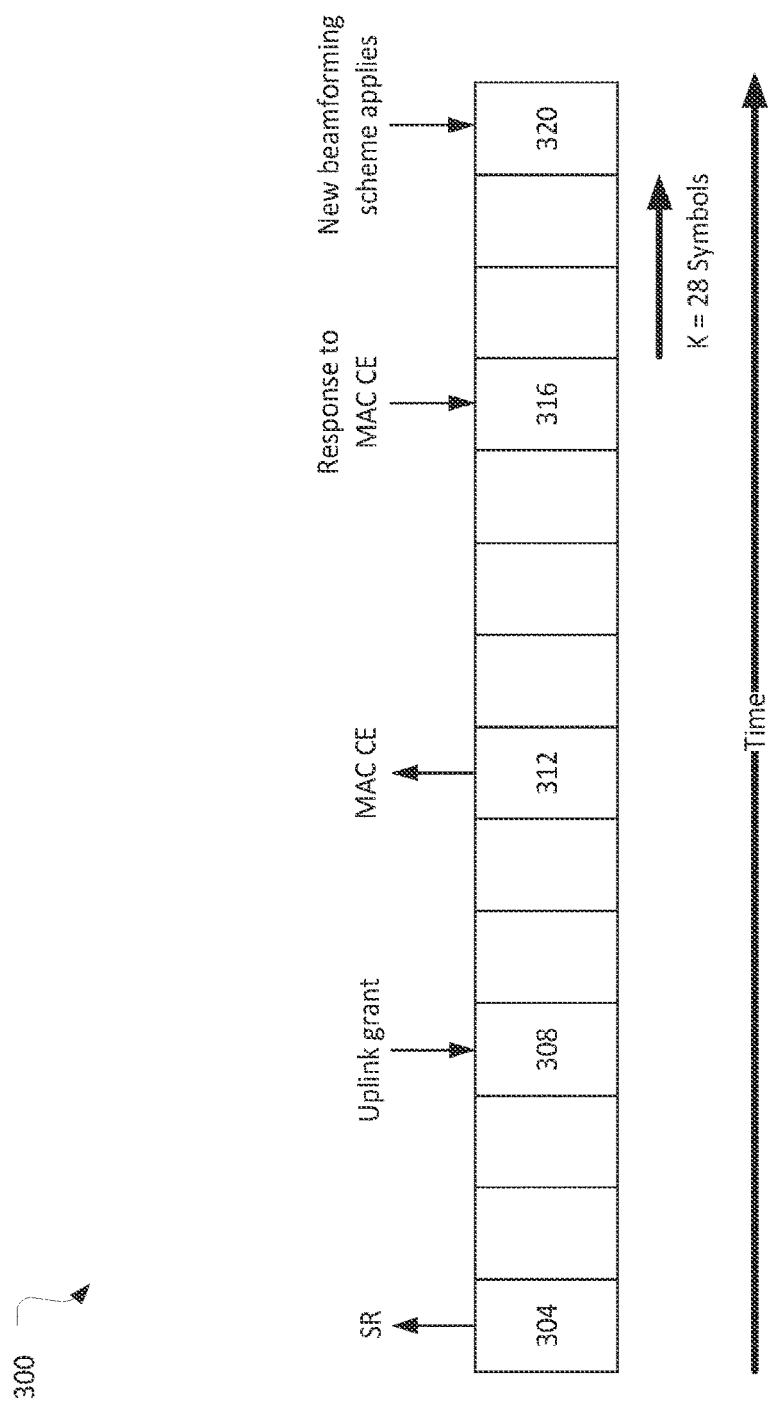
FIG. 3 illustrates uplink and downlink communication sequence in accordance with some embodiments.

FIG. 3 illustrates an uplink and downlink communication sequence in accordance with some embodiments.

At 304, the UE 104 may send a scheduling request (SR) to the gNB 108 to request uplink resources for a MAC CE to provide beamforming scheme update information. The SR may be a dedicated SR configured by RRC signaling for beamforming scheme update information. In other embodiments, the SR may be normal SR or the UE 104 may use a PRACH preamble transmission.

At 308, the UE 104 may receive an indication of an uplink grant from the gNB 108. The uplink grant may schedule uplink resources for the UE 104 to transmit a MAC CE The MAC CE may identify the beamforming scheme to be used by the UE 104 along with related information including, for example, a serving cell or serving cell list index, and a maximum number of receive beams of the UE 104. The maximum number of receive beams in the MAC CE may override any maxNumberOfRX Beams previously reported in a UE capability.

The UE 104 may transmit the MAC CE at 312. In some embodiments, the UE 104 may transmit the MAC CE with a hybrid automatic repeat request (HARQ) process ID that may allow a receiver to check for errors in received data and, if detected, buffer the data and request a retransmission from the sender.

At 316, the UE 104 may receive a response to the MAC CE from the gNB 108. The response could be an uplink grant for a new transmission for the same HARQ process ID that was used to transmit the MAC CE. Alternatively, the response could be a reconfiguration of some RRC parameters. The reconfiguration of the RRC parameters may facilitate the selected beamforming scheme as well as provide an acknowledgement/approval that the UE 104 may switch to the selected beamforming scheme.

In some embodiments, a default beamforming scheme may be pre-defined as, for example, codebook-based or channel-based. The MAC CE may then be used to change the default scheme if needed.

At 320, which may be K symbols after the UE 104 receives the gNB response at 316, the UE 104 can start to apply the new beamforming scheme. In some embodiments, K may be predefined or reported by UE capability.

In some embodiments, the gNB 108 may determine which beamforming scheme is to be used by the UE 104 in the event the UE 104 supports more than one beamforming scheme. The gNB 108 may signal which beamforming scheme to use using higher-layer signaling including, for example, RRC or MAC CE. In some embodiments, the beamforming scheme may be configured per bandwidth part, per serving cell, per serving cell group, or per UE. In embodiments in which the beamforming scheme is configured the same for more than one UE, the gNB 108 may incorporate the configuration information into system information or other broadcast control signaling.

In some embodiments the beamforming scheme may be configured for all types of BM-RSs, configured for each type of BM-RS, or configured for sets of BM-RS types.

In the event the gNB 108 instructs the UE 104 to use a particular beamforming scheme, the beamforming scheme may be implemented a period of time after the instruction. This period of time or action time may be predefined, reported by UE capability, or included within the control signaling that provides the instructions.

Similar to embodiments described above, in this embodiment one beamforming scheme may be determined to be the default scheme (for example, codebook-based beamforming or channel-based beamforming) to be applied in the absence of other signaling or indication.

In some embodiments, the UE 104 or the gNB 108 may determine an appropriate beamforming scheme based on network conditions. For example, in some embodiments the UE 104 may be configured with or otherwise determine RSRP/SINR thresholds that are relevant to the beamforming scheme determination. The UE 104 may report these thresholds to the gNB 108. Alternatively, the threshold may be predefined and known by both the UE 104 and the gNB 108. The UE 104 and the gNB 108 may both know that if the channel is in a first state, for example, the channel metrics are below the thresholds, the UE 104 is to use a first beamforming scheme. And if the channel is in a second state, for example, the channel metrics are above the thresholds, the UE 104 is to use a second beamforming scheme. The UE 104 may periodically perform channel state measurements to determine the channel metrics (as part of a typical CSI feedback process) and may provide the reports to the gNB 108 regarding the measurements. In this manner, both the UE 104 and the gNB 108 may know which beamforming scheme is to be used.

For example, in some embodiments, the beamforming scheme may be switched based on Layer 3 (L3)-RSRP or L3-SINR reports. If the reports indicate that RSRP/SINR are above a threshold known to both the UE 104 and the gNB 108, the channel-based scheme may be used. Otherwise, the codebook-based scheme may be used. In some embodiments, an action time may be associated with the reports. For example, the beamforming scheme may be updated at the UE 104 K symbols after a first report that indicates RSRP/SINR as above a threshold. The value K may be predefined or based on a UE capability report.

Figure 4:
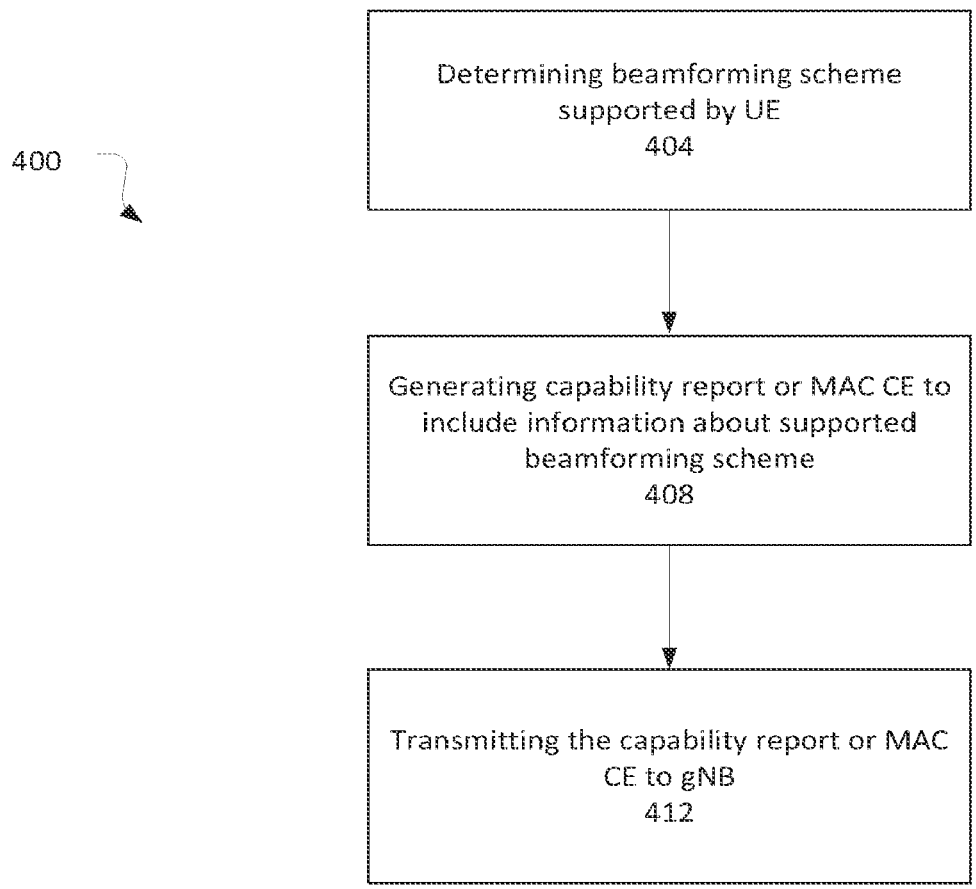
FIG. 4 illustrates an operational flow/algorithmic structure in accordance with some embodiments.

FIG. 4 may include an operation flow/algorithmic structure 400 in accordance with some embodiments. The operation flow/algorithmic structure 400 may be performed or implemented by a UE such as, for example, UE 104 or 800; or components thereof, for example, baseband processor 804A.

The operation flow/algorithmic structure 400 may include, at 404, determining a beamforming scheme supported by the UE. The beamforming scheme may be a channel-based beamforming scheme or a codebook-based beamforming scheme. In some embodiments, one beamforming scheme may be supported by the UE. In other embodiments, both beamforming schemes may be supported by the UE.

The operation flow/algorithmic structure 400 may further include, at 408, generating a capability report or MAC CE to include information about the beamforming scheme supported by the UE. In some embodiments, the information may include a beamforming scheme identifier to explicitly identify a beamforming scheme. In other embodiments, the information may be a parameter that is associated with a particular beamforming scheme. For example, the parameter may be a measurement restriction parameter that is associated with codebook-based beamforming scheme or a timing window parameter for a BM-RS burst that may be associated with a channel-based beamforming scheme.

In some embodiments, the UE may generate a capability report to indicate whether it supports one or two beamforming schemes and, if so, which ones. In some embodiments, the UE may generate a MAC CE to update a beamforming scheme that is employed by the UE. A MAC CE may be generated after, for example, a network condition has been detected that prompts a change in the beamforming scheme.

In some embodiments, the capability report or MAC CE may include a beamforming scheme supported for each of a number of BM-RS types. The BM-RS types may include an SSB for L1 RSRP/SINR report; CSI-RS in a resource set with or without repetition; an SSB/CSI-RS for beam failure detection; or an SSB/CSI-RS for radio link monitoring.

The operation flow/algorithmic structure 400 may further include, at 412, transmitting the capability report or MAC CE to a gNB. In some embodiments, the capability report may be transmitted in response to a capability inquiry from the gNB. In some embodiments, the MAC CE may be transmitted after the gNB has granted uplink resources for the transmission based on an earlier transmitted SR or PRACH preamble.

Figure 5:
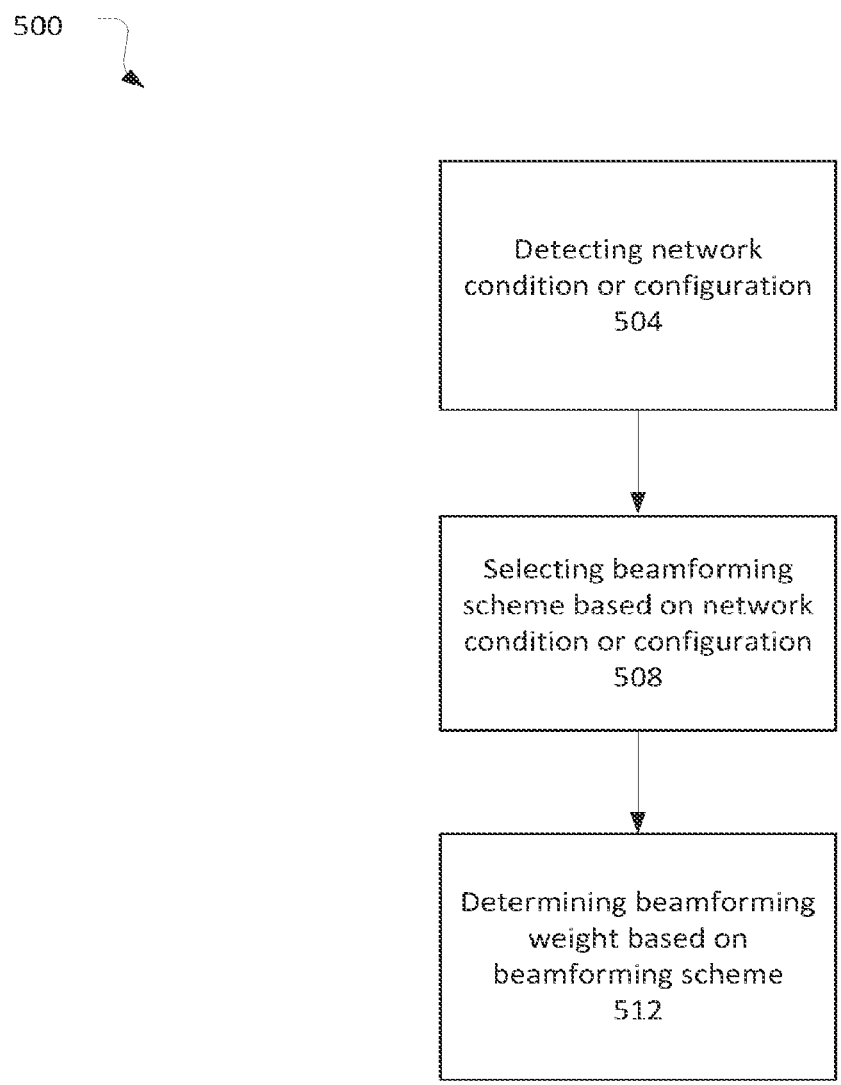
FIG. 5 illustrates an operational flow/algorithmic structure in accordance with some embodiments.

FIG. 5 may include an operation flow/algorithmic structure 500 in accordance with some embodiments. The operation flow/algorithmic structure 500 may be performed or implemented by a UE such as, for example, UE 104 or 800; or components thereof, for example, baseband processor 804A.

In some embodiments, the operation flow/algorithmic structure 500 may be performed or implemented by a UE that is capable of implementing a plurality of beamforming schemes.

The operation flow/algorithmic structure 500 may include, at 504, detecting a network condition or configuration. The network condition may be associated with a channel state. For example, channel metrics such as RSRP/SINR being greater than or less than a predetermined threshold. The configuration may be an instruction from a gNB to implement a particular beamforming scheme. Alternatively, the configuration may be an indication of a default beamforming scheme.

The operation flow/algorithmic structure 500 may further include, at 508, selecting a beamforming scheme based on the network condition or configuration. For example, if the UE detects that RSRP/SINR is less than a predetermined threshold, the UE may select codebook-based beamforming scheme. Alternatively, if the UE detects that the RSRP/SINR is greater than the predetermined threshold, the UE may select channel-based beamforming scheme. For another example, the UE may the beamforming scheme indicated by a configuration instruction or default configuration.

In some embodiments, the operation flow/algorithmic structure 500 may further include transmitting an indication of the selected beamforming scheme to the gNB. The indication may be included in a UE capability report or a MAC CE as described elsewhere herein.

The operation flow/algorithmic structure 500 may further include, at 512, determining beamforming weight based on the beamforming scheme. In the event channel-based beamforming scheme is selected, the UE may determine channel estimates using a prestored matrix and reference signals received on a plurality of OFDM symbols of a BM-RS resource; construct a channel from the channel estimates; and determine a beamforming weight based on the channel and the prestored matrix. In the event codebook-based beamforming scheme is selected, the UE may access the codebook to determine which of a plurality of matrices provide the highest quality reception, and use the selected matrix for the beamforming weight.

Figure 6:
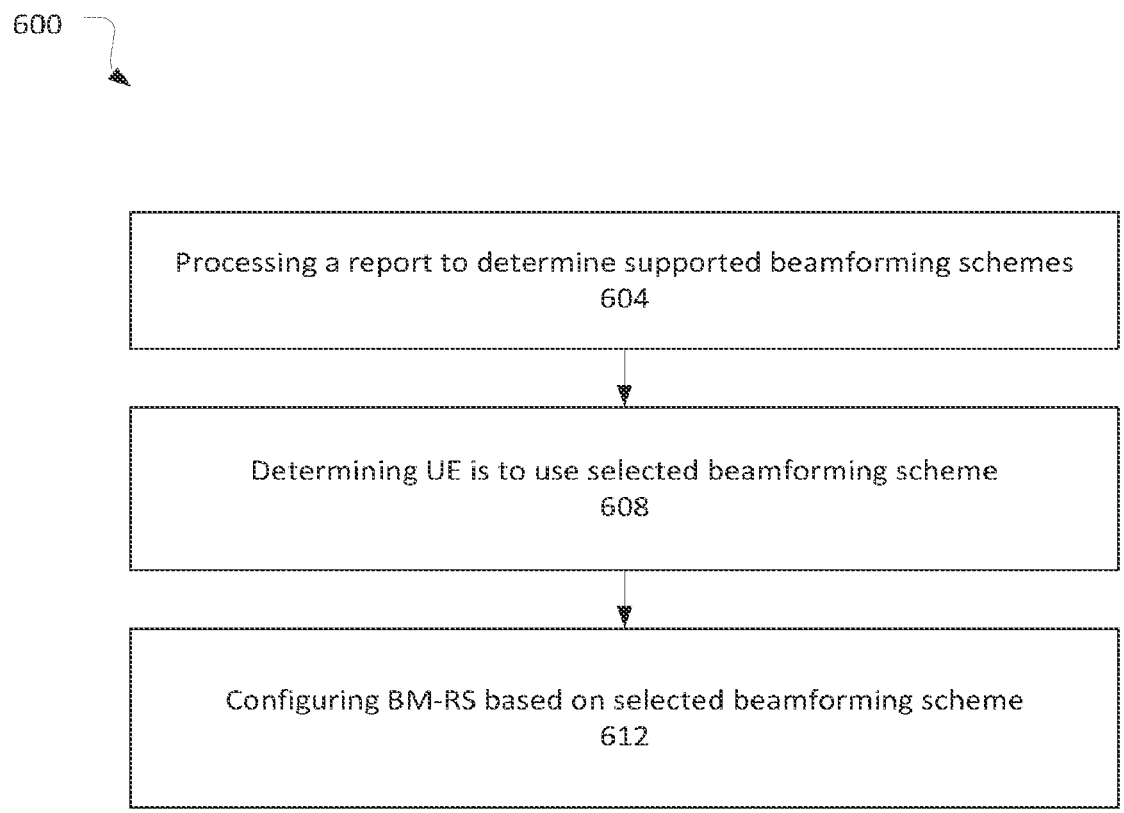
FIG. 6 illustrates an operational flow/algorithmic structure in accordance with some embodiments.

FIG. 6 may include an operation flow/algorithmic structure 600 in accordance with some embodiments. In some embodiments, the operation flow/algorithmic structure 600 may be performed or implemented by a gNB, for example, gNB 108 or 900; or components thereof, for example, baseband processor 904A.

The operation flow/algorithmic structure 600 may include, at 604, processing a report to determine the UE supports one or more beamforming schemes. In various embodiments, the report may be a UE capability report or a MAC CE as described herein.

If the report includes a UE capability report, the gNB may determine the one or more beamforming scheme supported by the UE based on an explicit indication in the report, for example, a beamforming scheme identifier, or based on an implicit indication, for example, a parameter associated with one beamforming scheme, but not the other.

The operation flow/algorithmic structure 600 may further include, at 608, determining the UE is to use a selected beamforming scheme. In some embodiments, the determination may be based on a signaling event, for example, the UE indicating that it is to use a beamforming scheme. In other embodiments, the determination may be based on an absence of a signaling event in which case the gNB may determine the UE is to use a default beamforming scheme.

The operation flow/algorithmic structure 600 may further include, at 612, configuring the BM-RS based on selected beamforming scheme. In some embodiments, the configuring of the BM-RS may include a serving cell configuration, a reference signal resource configuration, a TCI state configuration, etc. The gNB may configure the reference signals to appropriately support the beamforming scheme that is to be used by the UE. For example, in the event the UE is to use a channel-based beamforming scheme, the gNB may ensure they reference signal resources configured with a plurality of OFDM symbols that carry a sufficient number of BM-RS within a timing window.

Figure 7:
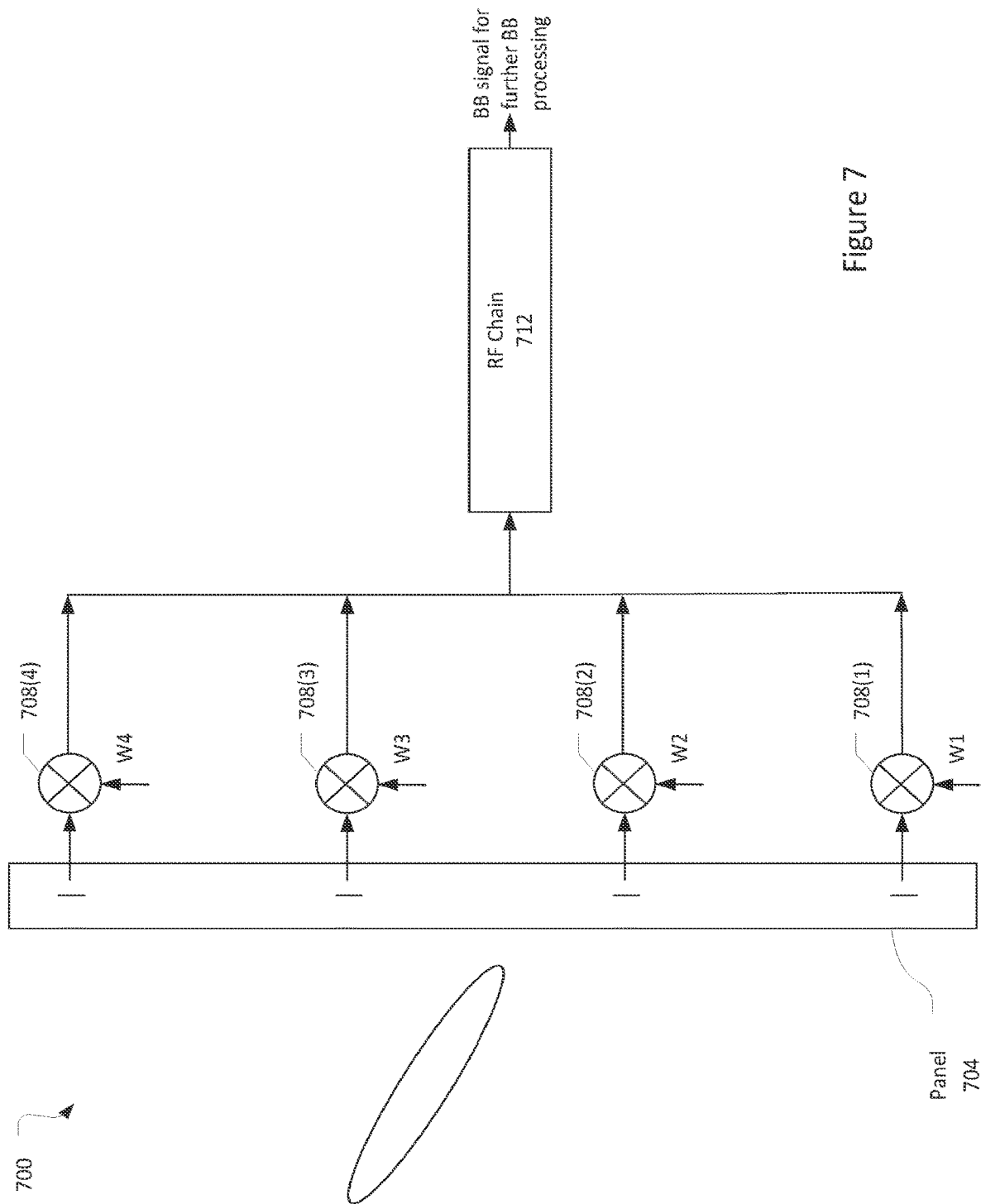
FIG. 7 illustrates receive components in accordance with some embodiments.

FIG. 7 illustrates receive components 70) of the UE 104 in accordance with some embodiments. The receive components 700 may include an antenna panel 704 that includes a number of antenna elements. The panel 704 is shown with four antenna elements, but other embodiments may include other numbers.

The antenna panel 704 may be coupled to analog beamforming (BF) components that include a number of phase shifters 708(1)-708(4). The phase shifters 708(1)-708(4) may be coupled with a radio-frequency (RF) chain 712. The RF chain 712 may amplify a receive analog RF signal, downconverts the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 708(1)-708(4) to provide a receive beam at the antenna panel 704. These BF weights may be determined based on the channel-based beamforming scheme (as described in FIG. 2, for example) or codebook-based beamforming scheme described herein.

Figure 8:
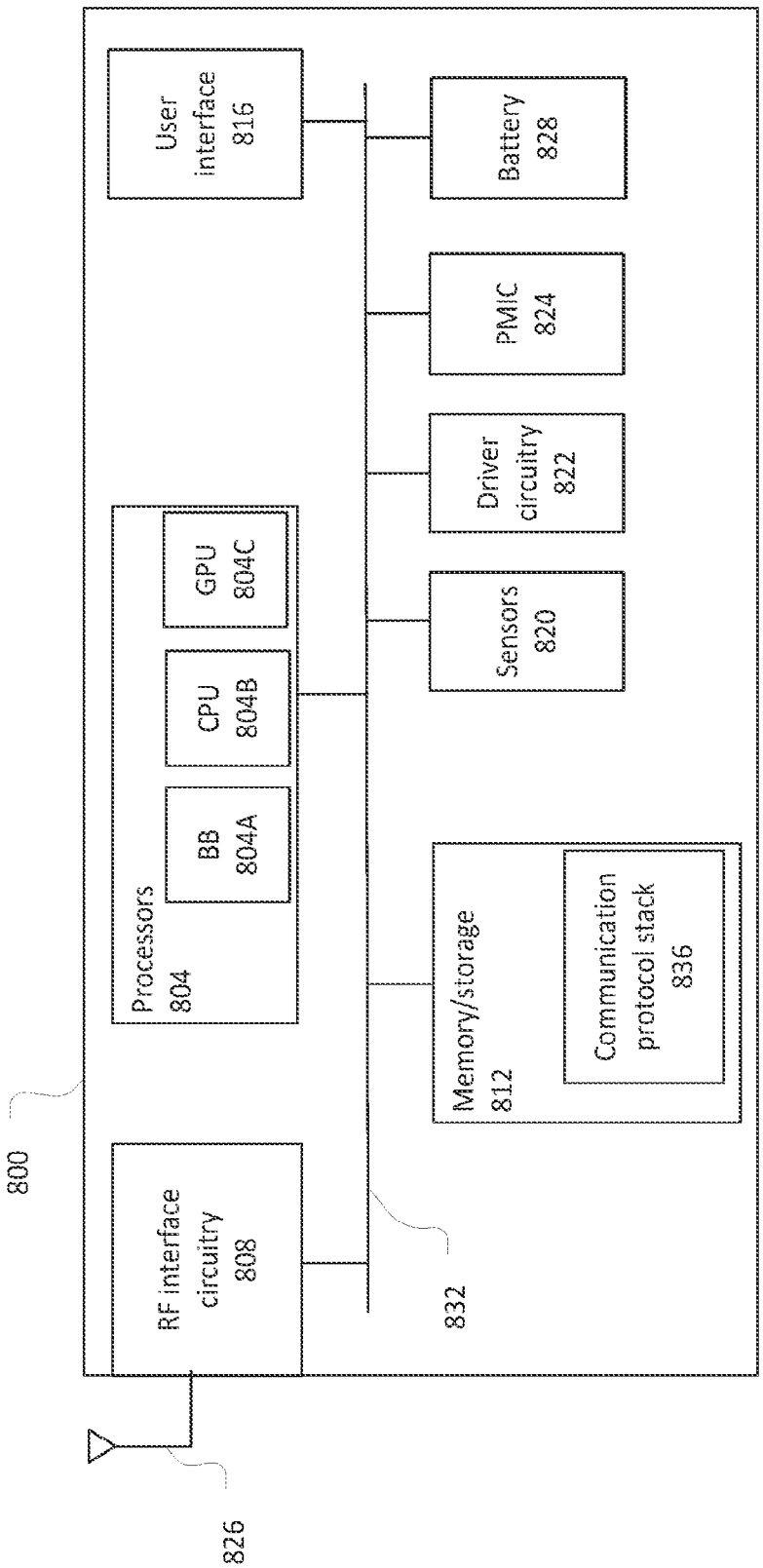
FIG. 8 illustrates a user equipment in accordance with some embodiments.

FIG. 8 illustrates a UE 800 in accordance with some embodiments. The UE 800 may be similar to and substantially interchangeable with UE 104 of FIG. 1. Similar to that described above with respect to UE 104, the UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; or relaxed-IoT devices. In some embodiments, the UE may be a reduced capacity UE or NR-Light UE.

The UE 800 may include processors 804, RF interface circuitry 808, memory/storage 812, user interface 816, sensors 820, driver circuitry 822, power management integrated circuit (PMIC) 824, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer: and perform control plane functions at a PHY layer, MAC layer. RLC layer, PDCP layer, RRC layer, and a non-access stratum "NAS" layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 804A may also access group information from memory/storage 812 to determine search space groups in which a number of repetitions of a PDCCH may be transmitted.

The memory/storage 812 may include any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random-access memory (DRAM), static random-access memory (SRAM), erasable programmable read-only memory (EPROM), electrically erasable programmable read only memory (EEPROM), Flash memory, solid-state memory, or any other type of memory device technology.

The RF interface circuitry 808 may include transceiver circuitry and radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 826 and proceed to filter and amplify (with a low-noise amplifier) the signal. The signal may be provided to a receiver of the transceiver that downconverts the RF signal into a baseband signal that is provided to the baseband processor of the processors 804.

In the transmit path, the transmitter of the transceiver upconverts the baseband signal received from the baseband processor and provides the RF signal to the RFEM. The RFEM may amplify the RF signal through a power amplifier prior to the signal being radiated across the air interface via the antenna 826.

In various embodiments, the RF interface circuitry 808 may be configured to transmit/receive signals in a manner compatible with NR access technologies.

The antenna 826 may include a number of antenna elements that each convert electrical signals into radio waves to travel through the air and to convert received radio waves into electrical signals. The antenna elements may be arranged into one or more antenna panels. The antenna 826 may have antenna panels that are omnidirectional, directional, or a combination thereof to enable beamforming and multiple input, multiple output communications. The antenna 826 may include microstrip antennas, printed antennas fabricated on the surface of one or more printed circuit boards, patch antennas, phased array antennas, etc. The antenna 826 may have one or more panels designed for specific frequency bands including bands in FR1 or FR2.

The user interface circuitry 816 includes various input/output (I/O) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 800.

The sensors 820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors: temperature sensors (for example, thermistors); pressure sensors; barometric pressure sensors; gravimeters: altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices: etc.

The driver circuitry 822 may include software and hardware elements that operate to control particular devices that are embedded in the UE 800, attached to the UE 800, or otherwise communicatively coupled with the UE 800. The driver circuitry 822 may include individual drivers allowing other components to interact with or control various input/output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of sensor circuitry 820 and control and allow access to sensor circuitry 820, drivers to obtain actuator positions of electro-mechanic components or control and allow access to the electro-mechanic components, a camera driver to control and allow access to an embedded image capture device, or audio drivers to control and allow access to one or more audio devices.

The PMIC 824 may manage power provided to various components of the UE 800. In particular, with respect to the processors 804, the PMIC 824 may control power-source selection, voltage scaling, battery charging, or DC-to-DC conversion.

In some embodiments, the PMIC 824 may control, or otherwise be part of, various power-saving mechanisms of the UE 800. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 800 may power down for brief intervals of time and thus save power. If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The UE 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 828 may power the UE 800, although in some examples the UE 800 may be mounted deployed in a fixed location, and may have a power supply coupled to an electrical grid. The battery 828 may be a lithium ion battery or a metal-air battery, such as a zinc-air battery, an aluminum-air battery, a lithium-air battery, and the like. In some implementations, such as in vehicle-based applications, the battery 828 may be a typical lead-acid automotive battery.

Figure 9:
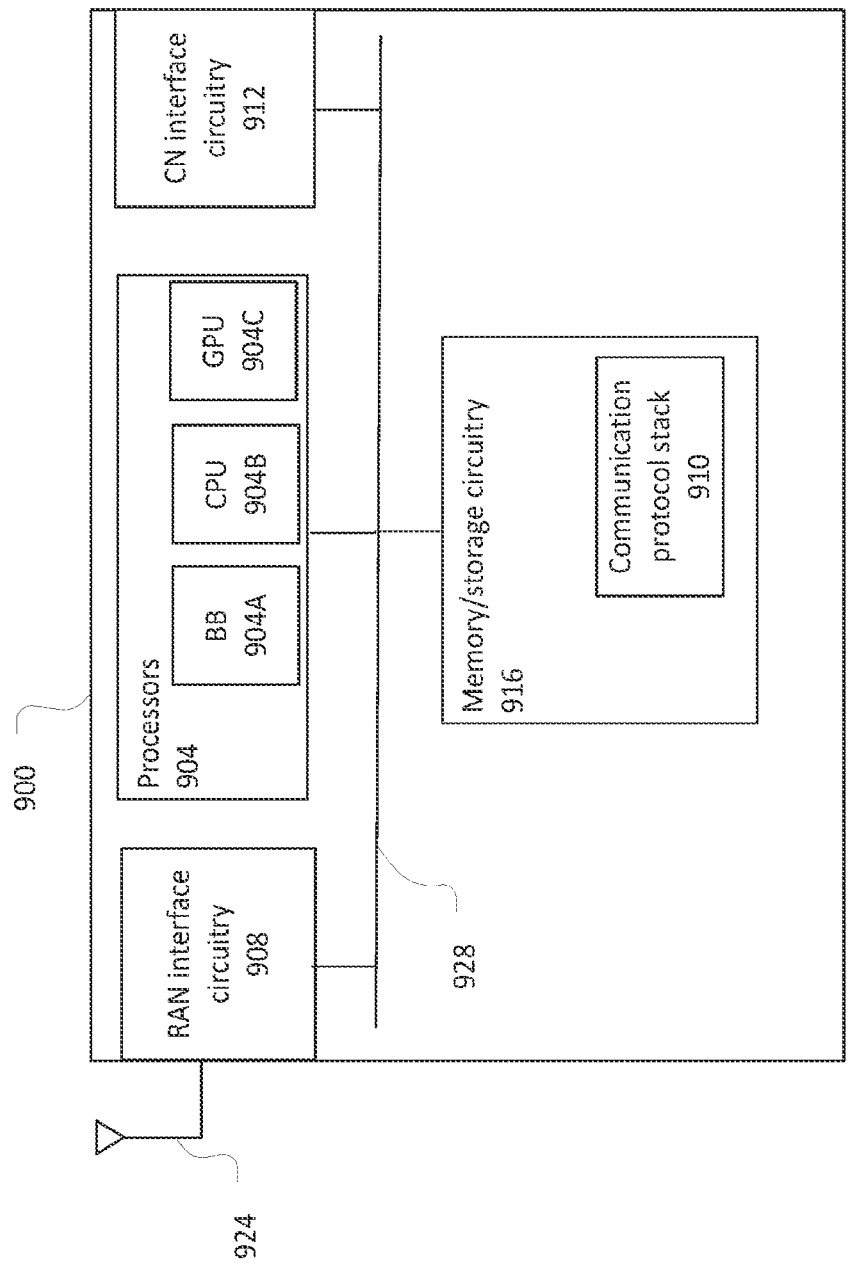
FIG. 9 illustrates a gNB in accordance with some embodiments.

FIG. 9 illustrates a gNB 900 in accordance with some embodiments. The gNB node 900 may similar to and substantially interchangeable with gNB 98.

The gNB 900 may include processors 904, RF interface circuitry 908, core network (CN) interface circuitry 912, and memory/storage circuitry 916.

The components of the gNB 900 may be coupled with various other components over one or more interconnects 928.

The processors 904, RF interface circuitry 908, memory/storage circuitry 916 (including communication protocol stack 910), antenna 924, and interconnects 928 may be similar to like-named elements shown and described with respect to FIG. 11.

The CN interface circuitry 912 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the gNB 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: determining a beamforming scheme supported by the UE, the beamforming scheme to include a channel-based beamforming scheme or a codebook-based beamforming scheme; generating a capability report or media access control (MAC) control element (CE) to include information about the beamforming scheme supported by the UE; and transmitting the capability report or MAC CE to a gNB.

Example 2 includes a method of example 1 or some other example herein, wherein the information includes a beamforming scheme identifier corresponding to the beamforming scheme.

Example 3 includes method of example 1 or some other example herein, wherein the information is to indicate a parameter that is associated with the beamforming scheme.

Example 4 includes a method of example 3 or some other example herein, wherein the parameter is a measurement restriction parameter for reference signal receive power (RSRP) or signal to interference and noise ratio (SINR) and is associated with the codebook-based beamforming scheme.

Example 5 includes a method of example 3 or some other example herein, wherein the parameter is a timing window parameter for a beamforming management reference signal burst that is associated with the channel-based beamforming scheme.

Example 6 includes a method of example 1 or some other example herein, wherein the information includes a beamforming scheme supported for individual beam management-reference signal (BM-RS) types.

Example 7 includes a method of example 6 or some other example herein, wherein the individual BM-RSs include a synchronization signal and physical broadcast channel block (SSB) for Layer 1 reference signal receive power (RSRP) or signal to interference and noise ratio (SINR) report; channel state information-reference signal (CSI-RS) in a resource set with repetition; CSI-RS in a resource set without repetition; SSB/CSI-RS for beam failure detection; or SSB/CSI-RS for radio link monitoring.

Example 8 includes a method of operating a UE, the method comprising: detecting a network condition or configuration; selecting, based on the network condition or configuration, a beamforming scheme from a channel-based beamforming scheme and a codebook-based beamforming scheme; and determining a beamforming weight to control the antenna panel based on the beamforming scheme.

Example 9 includes the method of example 8 or some other example herein, further comprising: transmitting a media access control (MAC) control element (CE) with an indication of the beamforming scheme selected.

Example 10 includes the method of example 9 or some other example herein, wherein the MAC CE includes an indication of a serving cell, a serving cell list, or a maximum number of receive beams.

Example 11 includes the method of example 9 or some other example herein, further comprising: transmitting a scheduling request or physical random access channel (PRACH) preamble to obtain an uplink grant for the MAC CE.

Example 12 includes the method of example 9 or some other example herein, further comprising: processing a response to the MAC CE: and applying the beamforming scheme a predetermined number of symbols after the response.

Example 13 includes the method of example 12 or some other example herein, further comprising: transmitting the MAC CE with a hybrid automatic repeat request (HARQ) process identifier, wherein the response includes an uplink grant to schedule a transmission with the HARQ process identifier.

Example 14 includes the method of example 12 or some other example herein, wherein the response includes a reconfiguration of radio resource control parameters.

Example 15 includes the method of example 12 or some other example herein, wherein the predetermined number of symbols is based on a UE capability.

Example 16 includes the method of example 8 or some other example herein, further comprising: receiving a control signal that includes the configuration; and selecting the beamforming scheme based on the configuration, wherein the control signal includes a radio resource control (RRC) signal or a media access control (MAC) control element (CE).

Example 17 include the method of example 16 or some other example herein, wherein the configuration is to configure the beamforming scheme for a bandwidth part, a serving cell, a serving cell group, or a specific UE.

Example 18 include the method of example 8 or some other example herein, further comprising: measuring a channel quality metric; comparing the channel quality metric to a predetermined threshold; and selecting the beamforming scheme based on comparison of the channel quality metric to the predetermined threshold.

Example 19 includes a method of operating a gNB, the method comprising: processing a report received from a UE to determine one or more beamforming schemes supported by the UE, the report to include a UE capability report or a media access control (MAC) control element (CE) and the one or more beamforming schemes to include a channel-based beamforming scheme or codebook-based beamforming scheme: determining that the UE is to use a beamforming scheme selected from the one or more beamforming schemes: and configuring beam management-reference signals (BM-RS) based on the beamforming scheme to be used by the UE.

Example 20 includes the method of example 19 or some other example herein, wherein processing the report comprises determining a plurality of beamforming schemes supported by the UE, and the method further comprises: transmitting, to the UE, an indication to use the beamforming scheme.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a user equipment (UE) to:
determine a beamforming scheme supported by the UE, the beamforming scheme to include a channel-based beamforming scheme or a codebook-based beamforming scheme;
generate a capability report or media access control (MAC) control element (CE) to include information about the beamforming scheme supported by the UE; and
transmit the capability report or MAC CE to a gNB.

2. The one or more non-transitory computer-readable media of claim 1, wherein the information includes a beamforming scheme identifier corresponding to the beamforming scheme.

3. The one or more non-transitory computer-readable media of claim 1, wherein the information is to indicate a parameter that is associated with the beamforming scheme.

4. The one or more non-transitory computer-readable storage media of claim 3, wherein the parameter is a measurement restriction parameter for reference signal receive power (RSRP) or signal to interference and noise ratio (SINR) and is associated with the codebook-based beamforming scheme.

5. The one or more non-transitory computer-readable media of claim 3, wherein the parameter is a timing window parameter for a beamforming management reference signal burst that is associated with the channel-based beamforming scheme.

6. The one or more non-transitory computer-readable media of claim 1, wherein the information includes a beamforming scheme supported for individual beam management-reference signal (BM-RS) types.

7. The one or more non-transitory computer-readable media of claim 6, wherein the individual BM-RS types include a synchronization signal and physical broadcast channel block (SSB) for Layer 1 reference signal receive power (RSRP) or signal to interference and noise ratio (SINR) report; channel state information-reference signal (CSI-RS) in a resource set with repetition; CSI-RS in a resource set without repetition; SSB/CSI-RS for beam failure detection; or SSB/CSI-RS for radio link monitoring.

* * * * *